(12) United States Patent
Gschwind

(10) Patent No.: US 10,078,523 B2
(45) Date of Patent: *Sep. 18, 2018

(54) METHOD TO BOOT A COMPUTER FROM A USER TRUSTED DEVICE WITH AN OPERATING SYSTEM LOADER STORED THEREON

(71) Applicant: International Business Machines Corporation, Armonk, NY (US)

(72) Inventor: Thomas Gschwind, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/721,996

(22) Filed: Oct. 2, 2017

(65) Prior Publication Data

US 2018/0024839 A1   Jan. 25, 2018

Related U.S. Application Data

(63) Continuation of application No. 14/725,742, filed on May 29, 2015, now Pat. No. 98,519,811.

(30) Foreign Application Priority Data

Jun. 26, 2014   (GB) .................................. 1411373.2

(51) Int. Cl.
*G06F 9/00* (2006.01)
*G06F 15/177* (2006.01)
(Continued)

(52) U.S. Cl.
CPC ............ *G06F 9/441* (2013.01); *G06F 9/4408* (2013.01); *G06F 21/575* (2013.01)

(58) Field of Classification Search
CPC ....... G06F 9/441; G06F 21/575; G06F 9/4408
See application file for complete search history.

(56) References Cited

U.S. PATENT DOCUMENTS

| 5,710,930 A | 1/1998 | Laney et al. |
| 7,765,393 B1 | 7/2010 | Lee et al. |

(Continued)

FOREIGN PATENT DOCUMENTS

GB      2508893 A    6/2014

OTHER PUBLICATIONS

Decision to Grant a Patent, Application No. GB1411373.2, dated May 10, 2016. 2 pages.

(Continued)

*Primary Examiner* — Jaweed A Abbaszadeh
*Assistant Examiner* — Gayathri Sampath
(74) *Attorney, Agent, or Firm* — Stosch Sabo

(57) ABSTRACT

In an approach to allowing a computer to boot from a user trusted device (UTD), the computer comprises a data storage device storing operating system (OS) services, and a version of an OS loader. The UTD is connectable to the computer and stores a boot loader, detectable by a firmware executing at the computer, and an OS loader, and wherein the UTD prevents an unauthenticated user to modify the boot loader and the OS loader stored thereon. The computer then, upon connection, lets the boot loader be detected by the firmware for execution of the boot loader at least partly at the computer, to cause to transfer the OS loader from the UTD to the computer, and executes the transferred OS loader at least partly from the computer, to execute at least one crypto driver for the OS, to start the OS services and complete booting of the computer.

1 Claim, 6 Drawing Sheets

(51) Int. Cl.
*G06F 9/4401* (2018.01)
*G06F 21/57* (2013.01)

(56) References Cited

U.S. PATENT DOCUMENTS

| | | | |
|---|---|---|---|
| 8,732,527 | B2 | 5/2014 | Tabone et al. |
| 9,135,447 | B1 | 9/2015 | Nanda |
| 2001/0039612 | A1 | 11/2001 | Lee |
| 2006/0053272 | A1* | 3/2006 | Roth ............... G06F 9/44505 713/1 |
| 2007/0050611 | A1 | 3/2007 | Weikel |
| 2007/0079112 | A1* | 4/2007 | Lewis ............... G06F 21/575 713/2 |
| 2007/0280510 | A1 | 12/2007 | Owen et al. |
| 2007/0283140 | A1* | 12/2007 | Jones ............... G06F 9/4403 713/2 |
| 2008/0052507 | A1 | 2/2008 | Chow et al. |
| 2008/0301425 | A1 | 12/2008 | Mittapalli et al. |
| 2009/0094447 | A1 | 4/2009 | Yang et al. |
| 2010/0125723 | A1 | 5/2010 | Cooper et al. |
| 2011/0055540 | A1 | 3/2011 | Lin et al. |
| 2011/0078429 | A1 | 3/2011 | Yang et al. |
| 2011/0113227 | A1 | 5/2011 | Lu et al. |
| 2012/0011354 | A1 | 1/2012 | Owen |
| 2012/0019379 | A1 | 1/2012 | Ayed |
| 2014/0040605 | A1 | 2/2014 | Futral et al. |
| 2014/0101426 | A1 | 4/2014 | Senthurpandi |
| 2015/0317471 | A1 | 11/2015 | Baentsch et al. |
| 2015/0378744 | A1 | 12/2015 | Gschwind |

OTHER PUBLICATIONS

International Search Report, Application No. GB1411373.2, dated Dec. 17, 2014. 2 pages.
Letter of Examination, Application No. GB1411373.2, dated Apr. 8, 2016. 1 page.
GB1411373.2, "Booting a Computer From a User Trusted Device With an Operating System Loader Stored Thereon", Filed: Jun. 26, 2014, 31 pages.
Turpe et al., "Attacking the BitLocker Boot Process", Trust Lab, 2nd International Conference on Trusted Computing (Trust 2009), Oxford, UK; Apr. 6-8. DOI: 10.1007/978-3-642-00587-9_12, © Springer, pp. 1-14.
Witjes et al., "The Windows 7 Boot Process (sbsl)", TechNet Articles, Microsoft, Printed on: May 13, 2015, © 2015 Microsoft Corporation, pp. 1-6, <http://social.technet.microsoft.com/wiki/contents/articles/11341.the-windows-7-boot-process-sbsl.aspx>.
Gschwind, "Booting a Computer From a User Trusted Device With an Operating System Loader Stored Thereon", U.S. Appl. No. 15/721,999, filed Oct. 2, 2017.
List of IBM Patents or Patent Applications Treated as Related, dated Sep. 26, 2017, pp. 1-2.

* cited by examiner

METHOD TO BOOT A COMPUTER FROM A USER TRUSTED DEVICE WITH AN OPERATING SYSTEM LOADER STORED THEREON

BACKGROUND OF THE INVENTION

The invention relates in general to the field of methods for securely booting computers, and in particular to methods for booting a computer from a user trusted device, such as a light, protected memory device.

Today, more and more computer users encrypt their hard disks (or more generally their long-term data storage device) to ensure that, in case of loss of the hard disk, the "finder" does not gain access to the user's data. Full disk encryption works fine to prevent such a finder to access the data. However, the usual disk encryption solutions do not prevent somebody who has access to the computer to spy out the legitimate user's password.

Systems that use encrypted disks need to be able to boot the computer from the hard disk, which can be accomplished by using an operating system ("OS") loader that is unencrypted, where the OS loader typically includes a boot loader. The BIOS (or the initializing firmware) would otherwise not be able to decrypt it and hence start it. This boot loader then prompts the user for a passphrase that is used to unlock the encryption key. With this key, the encrypted contents of the hard disk can be decrypted and the operating system can subsequently be started.

A problem that arises is that an attacker can manipulate the OS loader (stored in clear text) for it to store a copy of the passphrase (e.g., somewhere on the computer in clear text or send it to a server via the computer's network interface if available) the next time the user starts her/his computer. Once the computer has been started with the compromised OS loader, the attacker can read out the passphrase from his location and gain access to the computer.

BRIEF SUMMARY OF THE INVENTION

According to a first aspect, the present invention is embodied as a method for allowing a computer to boot from a user trusted device, wherein: the computer comprises a long-term data storage device storing operating system services, or OS services, and a version of an operating system loader, or OS loader; and the user trusted device is connectable to the computer and stores: a boot loader, detectable and executable by a firmware executing at the computer, upon connection of the user trusted device to the computer; and an OS loader, for an operating system, or OS, of the computer, the OS loader corresponding to the version of the OS loader as stored on the data storage device of the computer, wherein the user trusted device is designed to prevent an unauthenticated user to modify any of the boot loader and the OS loader stored thereon, the method comprising: upon connection of the user trusted device to the computer, letting the boot loader be detected by the firmware for subsequent execution of the boot loader at least partly at the computer, to cause to transfer the OS loader from the user trusted device to the computer; and executing the transferred OS loader at least partly from the computer, to cause to execute at least one crypto driver for the OS and a kernel of the OS, to start the OS services and complete booting of the computer.

In preferred embodiments, the boot loader is designed such that the execution of the boot loader at least partly at the computer causes to: transfer the OS loader by loading it into a main memory of the computer, from the user trusted device, and storing contents of the loaded OS loader on the long-term data storage device of the computer; and modify a boot environment of the computer, to emulate a boot environment as if the computer were booting from the long-term data storage device, and execute the transferred OS loader in the modified boot environment, to cause to execute the at least one crypto driver and the kernel.

Preferably, the boot loader is furthermore designed such that the execution of the boot loader causes to: identify an initial boot block of executable code, such as a master boot record, in the OS loader loaded in the main memory of the computer; and execute the initial boot block of executable code as stored in the main memory of the computer, to thereby execute the transferred OS loader, wherein the boot environment is modified prior to executing the loaded initial boot block of executable code.

In embodiments, the boot loader is furthermore designed such that the execution of the boot loader causes, at the step of storing the contents of the loaded OS loader on the long-term data storage device, to store contents of the OS loader that comprise only a remainder part of the loaded OS loader, which remainder part does not comprise the identified initial boot block of executable code.

Preferably, the boot loader is furthermore designed such that the execution of the boot loader causes to modify the boot environment by: setting a boot device parameter, such as a dl register, to a device identifier of the data storage device; and starting execution of the loaded or stored initial boot block of executable code to trigger execution of other blocks of the transferred OS loader.

In embodiments, the boot loader is furthermore designed such that the execution of the boot loader causes to copy the identified boot block of executable code to a suitable address in the main memory, prior to starting execution of the loaded or stored initial boot block of executable code.

Preferably, the method further comprises, prior to the afore mentioned connection of the user trusted device to the computer: analyzing the long-term data storage device to detect a version of the OS loader which resides unencrypted on the data storage device of the computer; and, after authentication to the user trusted device, copying a detected version of the OS loader to the user trusted device, as the OS loader.

In preferred embodiments, the method further comprises: retrieving at least one key for encrypting and decrypting the data storage device; and storing the retrieved at least one key on the user trusted device or an entity accessible by the user trusted device, such as a smart card and, preferably, removing the retrieved at least one key from the computer.

Preferably, the method further comprises, after completing the booting of the computer: monitoring changes to the version of the OS loader, which resides unencrypted on the data storage device of the computer; and upon detecting a change to the version of the OS loader, authenticating to the user trusted device and updating the OS loader stored on the user trusted device accordingly.

In embodiments, the method further comprises: upon connection of the user trusted device to the computer, letting the boot loader be detected by a firmware of the computer for subsequent execution at least partly at the computer, to cause to: compare the version of the OS loader already on the computer to the OS loader as transferred from the user trusted device; and if the compared versions do not differ, execute the transferred OS loader at least partly from the computer.

In preferred embodiments, the method further comprises: if the compared versions differ, notifying a user that the compared versions differ.

Preferably, the execution of the boot loader further causes to: if the compared versions differ, store contents of the OS loader, as loaded in a main memory of the computer, on the data storage device of the computer. In particular, the user may be involved to confirm whether contents of the OS loader can be stored on the data storage device of the computer, in order to continue to boot the OS.

In variants, the execution of the boot loader may cause to allow the user to shut down the computer, e.g., to provide it to a forensic team in order to obtain more information about the origin of the difference found. Alternatively, allowing the user to store contents the OS loader, as loaded in a main memory of the computer, on the data storage device of the computer and continuing to boot the OS.

According to another aspect, the invention is embodied as a user trusted device designed for allowing a computer to boot from the device, wherein the user trusted device is connectable to the computer and stores: a boot loader, detectable and executable by a firmware executing on the computer, upon connection of the user trusted device to the computer; an operating system loader, or OS loader, unencrypted, for an operating system, or OS, of the computer, the OS loader corresponding to a version of an OS loader as initially installed on the computer, and wherein: the user trusted device is furthermore designed to prevent any unauthenticated user to modify any of the boot loader and the OS loader stored thereon; and the boot loader and the OS loader are otherwise configured such as to allow for implementing steps as evoked above.

According to still another aspect, the invention can be embodied as a computerized system, comprising the above user trusted device, as well as the computer to which the user trusted device is connectable.

According to a final aspect, the invention can be embodied as a computer program product for allowing a computer to boot from a user trusted device, the computer program product comprising a computer-readable storage medium having computer-readable program code embodied therewith, preferably consisting of several modules, the computer-readable program code configured to implement all the steps of any of the aforementioned methods.

DETAILED DESCRIPTION OF THE INVENTION

The following description is structured as follows. First, general embodiments and high-level variants are described (sect. 1). The next section (sect. 2) addresses more specific embodiments and technical implementation details.

1. General Embodiments and High-Level Variants

Figure 2:
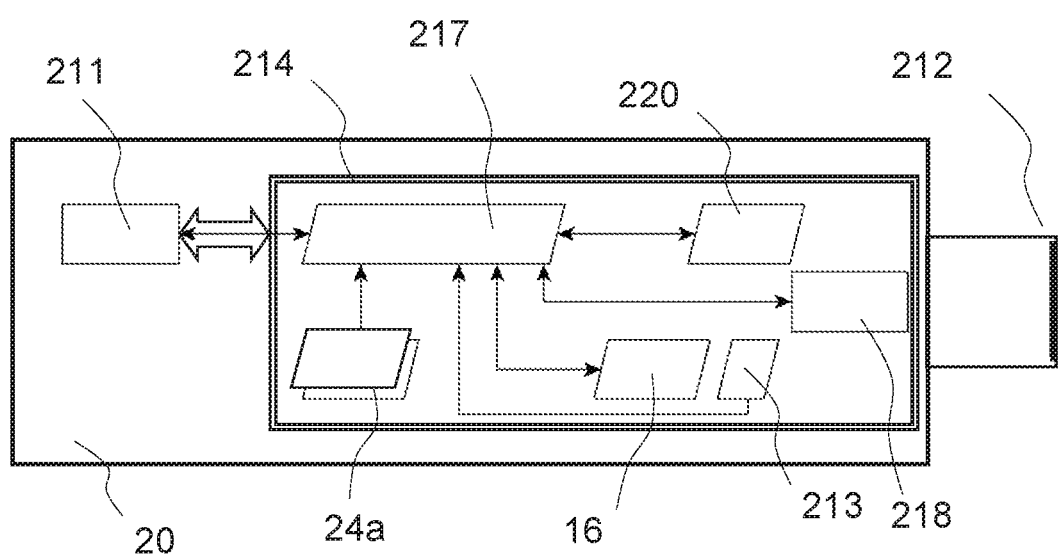
FIG. 2 schematically represents a user trusted device, according to embodiments of the invention; this device is specifically designed for implementing method steps involved in embodiments of the invention.
Figure 3:
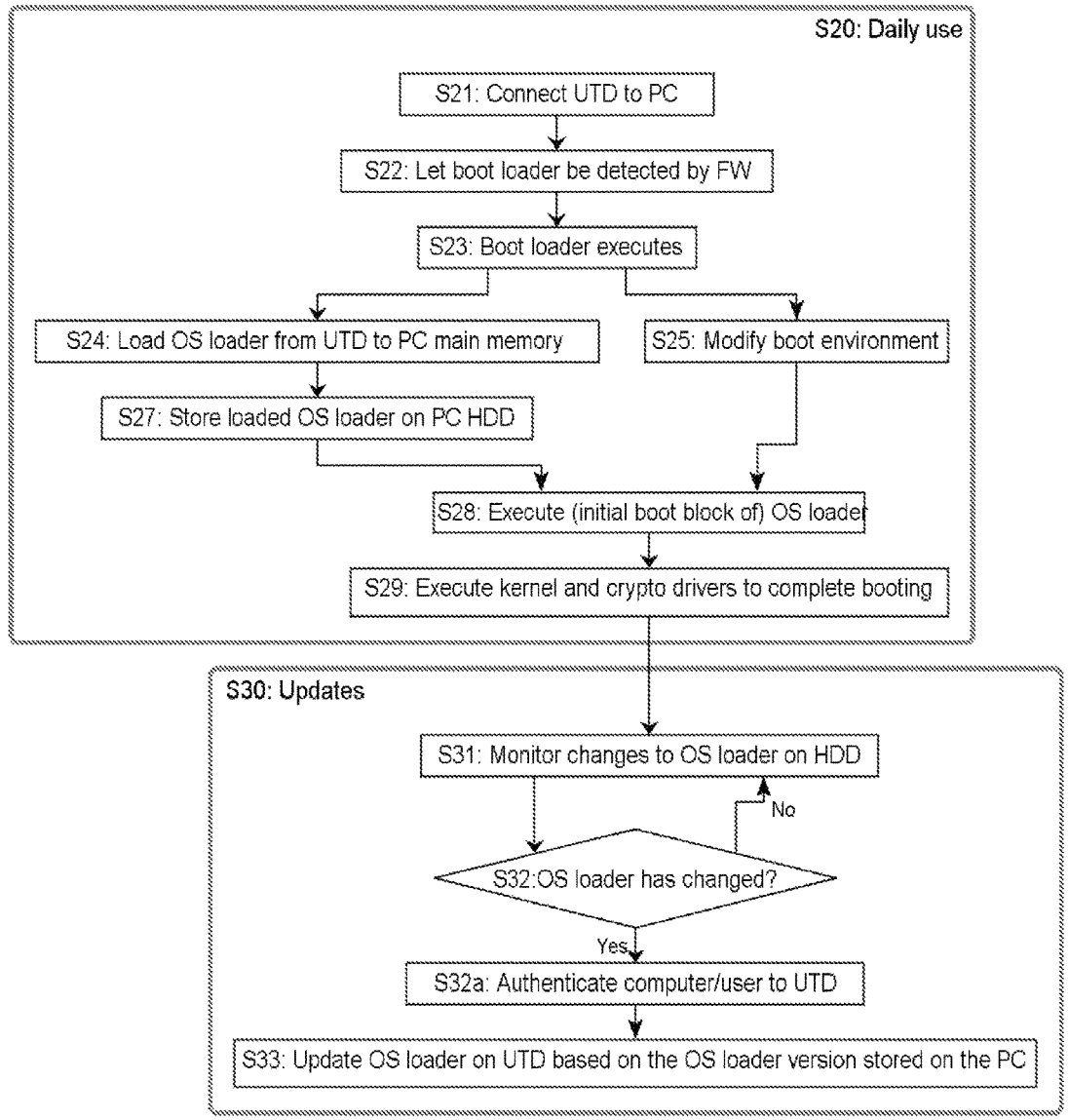
FIG. 3 is a flowchart illustrating high-level steps of a method for allowing a computer to boot from a user trusted device, according to embodiments.
Figure 4:
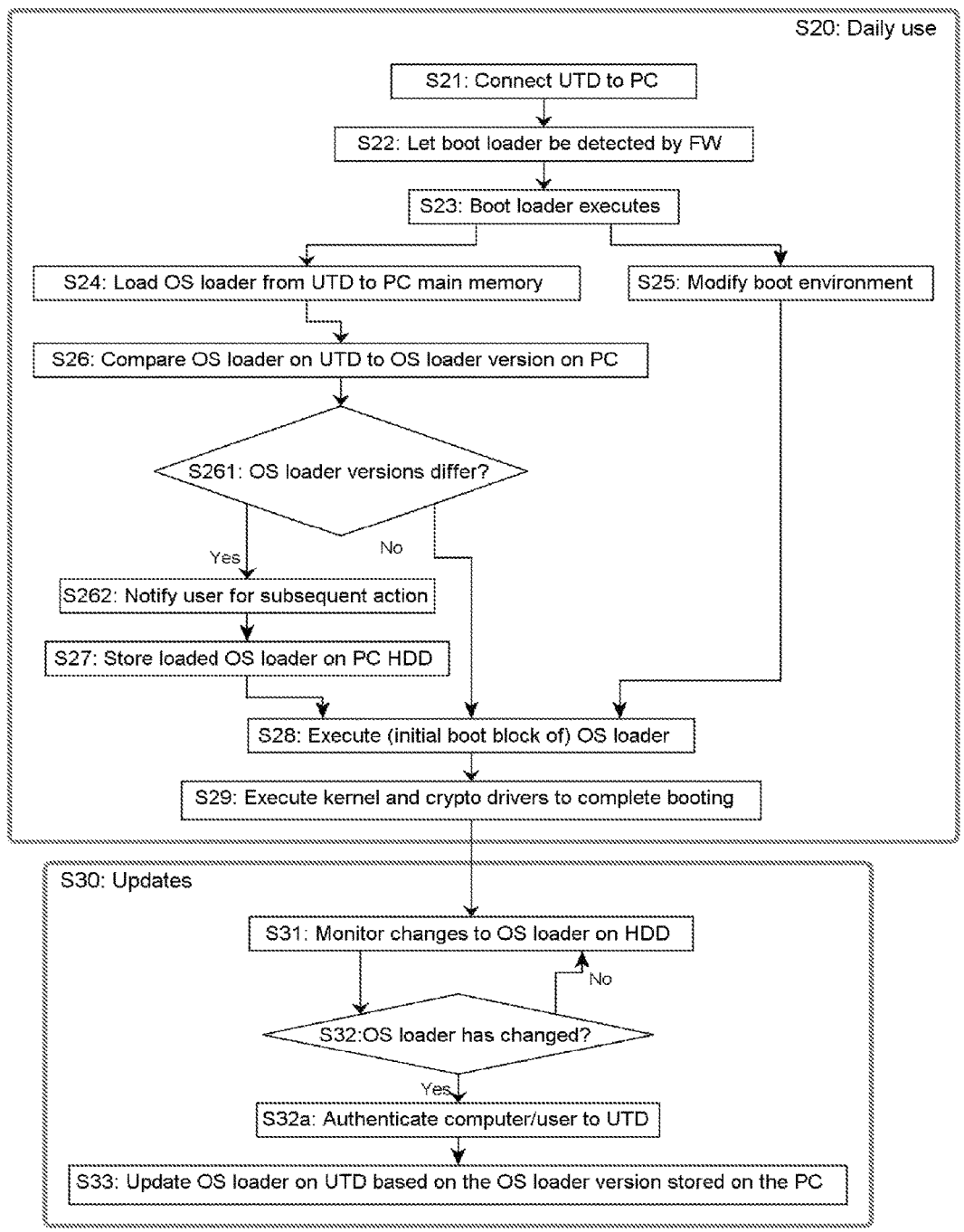
FIG. 4 is an alternate embodiment to FIG. 3.

Referring more particularly to FIGS. 3-4, an aspect of the invention is first described, which concerns methods for allowing a computer 10 to boot from a user trusted device 20. Some of the numeral references below refer to FIGS. 1 and 2, which respectively depict a computerized system (basically comprising a computer and a user trusted device connectable thereto) and such a user trusted device.

The context is the following. Basically, the computer comprises a long-term data storage device 11, which stores operating system services (hereafter called OS services), as well as a version of an operating system loader 24 (hereafter OS loader). Beyond the OS loader 24 and the OS services, the PC may further store other components of the OS itself, e.g., the OS kernel, system libraries, the crypto driver(s), and device drivers for the OS; the PC may further store application programs of the OS, although such components may also be stored elsewhere but such as to be available to the PC, as needed for booting. The long-term data storage device typically is a hard-disk drive (or HDD) or a solid-state memory or any other suitable mass storage device. Note that, in accordance with their usual meaning, the OS services are, here, not considered to include the OS kernel.

For illustration purposes (and without prejudice), it is, in the following, assumed that the computer is a general purpose computer, e.g., a PC, and that the long-term data storage device 11 is a HDD, without prejudice.

The user trusted device 20 (hereafter called UTD 20 for short), depicted in FIG. 2, is one that comprises appropriate interface means to connect to a PC. It notably stores a boot loader 16. A boot loader is known per se. In the present context, the boot loader that is stored on the UTD is detectable and executable by a firmware, e.g., a BIOS, executing at the PC 10, upon connection of the UTD 20 to the PC 10.

Upon connection of the user trusted device 20 to the PC 10, some components of the boot loader 16 may be transferred into the main memory 110 of the PC 10 for subsequent execution of the transferred part. This transfer is preferably instructed by or via the initialization firmware, e.g., the BIOS. The boot loader 16 is preferably only partly transferred (e.g., a component thereof is transferred to the PC 10). Its subsequent execution may thus be carried out partly at the PC 10 (e.g., in interaction with the firmware), and partly at the user trusted device 20, with both parts executing interactively. Note that, in variants, or alternate embodiments, the boot loader components transferred may also be executed at a graphic card or any suitable extension card of the computer, depending on the types of satellite processing means available. A concurrent (yet interactive) execution partly at the computer, partly at the user device is desired when additional operations need be performed (e.g., verification involving the BIOS), which is possible if the device 20 is equipped with suitable processing means 211.

The UTD 20 also stores an OS loader 24a, for the operating system 112 (or OS) of the PC 10. The OS loader 24a residing on the UTD 20 corresponds to, e.g., is a copy of the version of, the OS loader 24 as already stored on the HDD 11 of the PC 10. As explained below in detail, the version OS loader 24a needs, however, not be strictly identical to the initial version OS loader 24. The OS loader 24 can be regarded as a pre-boot environment (not to be confused with the so-called PXE pre-boot environment), i.e., the OS loader 24 is some code, which is able, upon execution, to load the crypto driver(s), OS kernel, and, if necessary, contribute to initialize the hardware (as is the case for, e.g., Windows OSs).

Note that the boot loader stored on the UTD 20 differs from a boot loader that is potentially part of the OS loader 24, so that the two types of boot loader should be distinguished. Both are boot loaders in the sense that they make it possible to start booting. However, the boot loader 16 on the UTD 20 makes it possible to transfer the OS loader 24a (and in that sense is a boot enabling entity), while the boot loader 16 potentially present on the OS loader 24 is, functionally speaking, closer to the PC, inasmuch as it triggers the OS loader's main functions, i.e., to start the OS kernel and thus the OS services.

Each of the boot loader 16 and the OS loader 24a is executable code, e.g., code in binary form. The OS loader 24a and the boot loader 16 may reside unencrypted on the UTD 20. Preferably, however, they reside encrypted on the UTD 20. In the latter case, they can be decrypted by the UTD 20, on the fly, in view of executing them, thanks to optional additional capabilities of the UTD 20 that will be described later. They may also be decrypted by the PC 10, depending on the context.

The UTD 20 is furthermore designed to prevent an unauthenticated user to modify any of the boot loader 16 and the OS loader 24a stored thereon. The UTD 20 is preferably a secure device, i.e., equipped with a secure memory, although this needs not necessarily be the case.

Concerning now the method steps of FIG. 3 as such, denoted as S20 for daily use, the above method essentially comprises two steps: First, upon connection S21 of the UTD 20 to the PC 10, the boot loader 16 is, detected S22 by the PC's firmware. This leads to execute S23 the boot loader. As evoked above, execution of the boot loader may take place at the PC 10 only, or concurrently at the UTD 20 and the PC 10. In all cases, the PC 10 needs to execute some code in order to start booting, such that the execution of the boot loader shall take place at least partly at the PC 10. The execution of the boot loader causes, in turn, to transfer S24 the OS loader 24a from the UTD 20 to the PC 10.

Second, the transferred OS loader 24b executes S28 (at least partly from the PC 10), to cause to execute S29 a crypto driver for the OS (or several crypto drivers, as necessary to decrypt the HDD) and a kernel of the OS, in order to start the OS services and thereby complete the booting of the PC 10, i.e., eventually, this is the entire OS which is typically meant to execute.

OS services mean the services that the OS provides to the user and application programs. The OS services typically come in (i.e., comprise) the form of system libraries, system services (such as a logon or file sharing service) or device drivers for the user or the application programs can interact with the PC's hardware. Note that the OS services that are stored on the PC 10, are preferably not stored on the UTD 20, contrary to solutions where a PC is booted from an external device such as a USB device that contains a full OS or most substantial components thereof. Similarly, OS libraries or applications are preferably not stored on the UTD 20 and are stored on the PC 10.

Embodiments of the above method are illustrated in FIGS. 3-7. They allow to securely boot a PC 10, even in situations where an attacker or malware tampers with the OS loader, it being noted that the latter typically resides unencrypted (and modifiable) on the PC (it generally needs to be unencrypted in order to be able to start the boot process). In embodiments of the present invention, even if the OS loader of the PC has been tampered with, the PC can safely start the boot process thanks to the OS loader stored on the UTD, which by definition is in a safer place. Meanwhile, the present methods are lighter and, in turn, more versatile and easy to implement, inasmuch as only the boot loader and the OS loader need be stored on the UTD, such that only very few components need be updated on the UTD, for these to remain synchronous with their counterparts residing on the PC.

Several instances of the OS loader are accordingly involved. Reference OS loader 24 of FIG. 1 corresponds to the initial or current version of the OS loader as stored on the PC 10's HDD 11. Reference OS loader 24a denotes the corresponding version (e.g., a mere copy) as stored on the UTD 20, whereas reference OS loader 24b corresponds to the version transferred from the UTD 20 to the PC 10. Note that the OS loader 24b shall not be executed concurrently with any other version (initial or current version 24) as already stored on the HDD 11. Still, the loaded OS loader 24b may possibly interact with additional or complementary modules of the UTD, which modules may execute partly or fully at the UTD, thanks to its processing capability, if any. Additional or complementary modules may for instance execute at the UTD 20 if, for example, the user or the computer is requested to authenticate to a smart card and/or, if keys need be retrieved keys from the UTD 20.

In embodiments, the boot loader 16 is designed such that the execution S23 of the boot loader (which occurs at least partly at the PC 10) further causes to transfer the OS loader 24a by loading S24 the OS loader 24a into the main memory 110 of the PC 10, from the UTD 20. Then, contents of the loaded OS loader (now denoted by reference 24b) are stored S27 on the HDD 11 of the PC 10. The executing boot loader will furthermore cause to modify S25 the boot environment of the PC 10, to emulate a boot environment as if the PC 10 were booting from the HDD 11, such as to be able to execute S28 the transferred OS loader 24b in the modified boot environment. In turn, the latter causes to execute the crypto driver(s) and OS kernel, as discussed earlier, and in turn the entire OS may be executed.

In the present context, because the boot process initially starts from the UTD 20 and that parts of the OS loader 24b are stored on the HDD 11 (rather than being loaded in the main memory 110 only), one needs to force the transferred OS loader 24b (whose contents now reside at least partly on the HDD) to look, upon execution, for a kernel of the OS (as well as other data, file or code that the OS loader 24b may require for completing the boot process, if any) as stored on the HDD 11 and not on the UTD 20. Otherwise, it can be realized that the OS loader 24b may be prompted by the boot environment to look, by default, for a kernel located on the UTD 20. The boot environment comprises files, data (and in particular device parameters) that are involved upon booting.

To make this possible, the boot environment may be modified, such as to emulate a boot environment as if the PC 10 were booting from its long-term storage device (e.g., the HDD) and not from the UTD 20, as initially involved. This modification needs be performed prior to executing the transferred OS loader 24b (typically prior to executing initial boot blocks of executable code of the OS loader). The subsequent execution of the OS loader 24b shall accordingly result in executing the OS kernel and crypto driver(s) for the OS that are stored on the HDD 11.

Note that, depending on the implementation chosen, the OS kernel may be stored on the UTD 20 or not. The crypto drivers are preferably stored on the UTD 20, preferably as part of the OS loader 24b, for reasons discussed later. Beyond these components, however, it should be reminded that most of the components of the OS are preferably not stored on the UTD 20. For example, the other components needed for the OS to complete booting, like libraries, system services, additional device drivers, applications, etc., are preferably stored on the PC 10 (or such as to be available to it) and not on the UTD 20.

Figure 6:
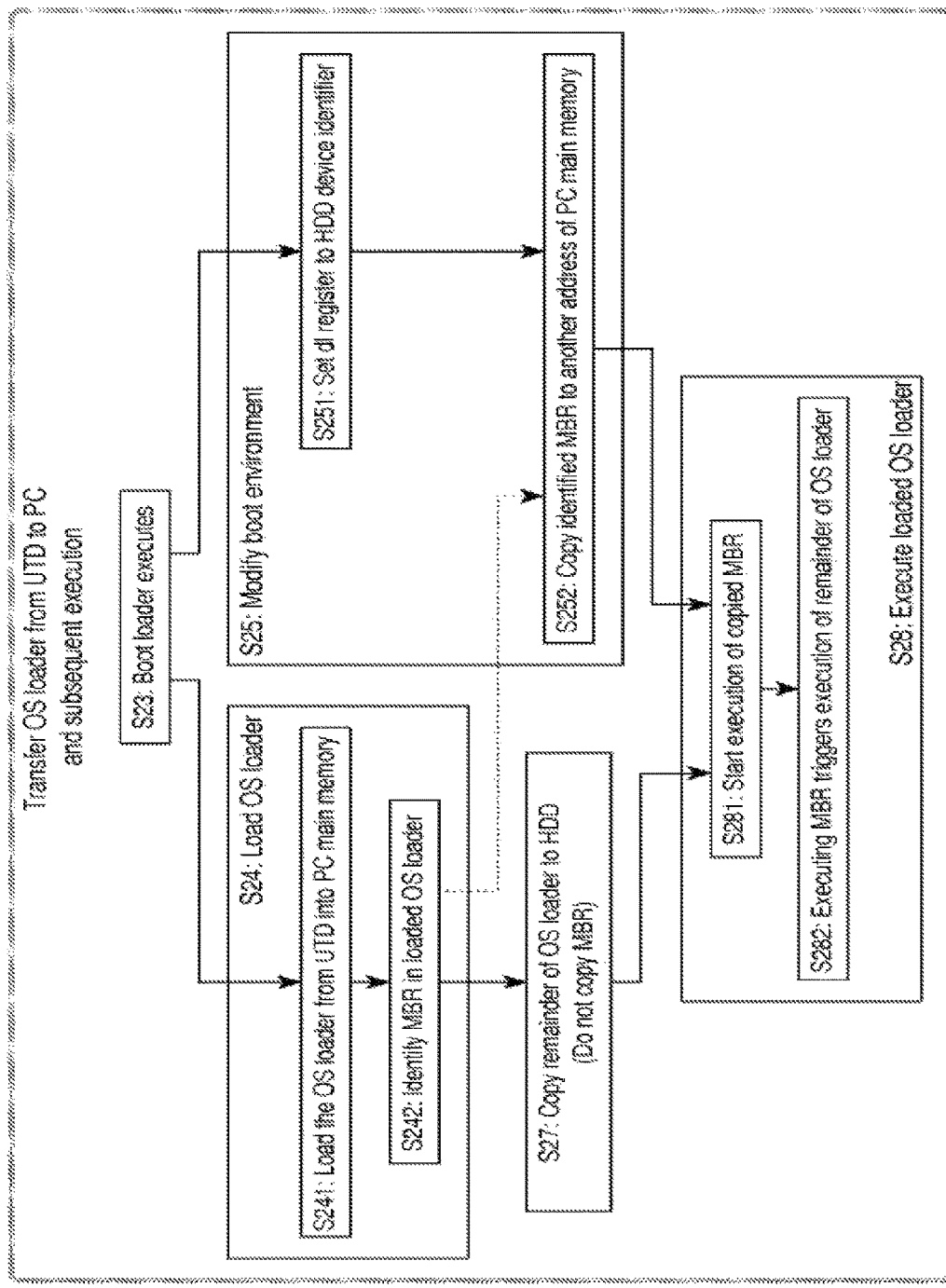
FIG. 6 is a flowchart showing detailed steps for transferring and executing an operating system loader from a user trusted device to a computer, according to embodiments.

At present, particularly advantageous ways of transferring the OS loader 24b from UTD 20 to the PC 10 and executing it are described in reference to FIG. 6. As illustrated therein, in embodiments, the boot loader 16 may furthermore be designed such that the execution S23 of the boot loader, as discussed with respect to FIG. 3, will cause to: identify S242 an initial boot block of executable code (e.g., sometimes, in an embodiment, master boot record or MBR in the context of certain PCs), in the OS loader 24b as loaded S241 in the main memory of the PC 10; and then execute S28 the initial boot block of executable code as stored in the main memory of the PC 10, to trigger execution of the transferred OS loader 24b, it being noted that the boot environment needs, in this case, be modified prior to executing S27-S28 the loaded initial boot block of executable code.

The initial boot blocks are a tiny executable code upfront (in terms of execution, not necessarily in terms of location) the main contents of the OS loader 24b, in the OS loader 24b. The distinction between the initial boot blocks of executable code of the OS loader 24b and the remainder can easily be achieved. For instance, for traditional BIOSes of compatible PCs, the first 512 bytes correspond to these initial boot blocks.

In addition, the boot loader 16 may furthermore be designed such that its execution S23 causes, when storing S27 the contents of the loaded OS loader 24b on the HDD 11, to store contents of the OS loader 24b that comprise only a remainder part of the loaded OS loader 24b. I.e., the remainder part does not comprise the identified initial boot block of executable code, e.g., the MBR.

Loading the initial boot blocks of executable code into the main memory 110 and subsequently executing them from there, while only storing a remainder part on the HDD 11, allows to look for corresponding OS loader 24b contents (now stored on the HDD), while preventing the PC 10 to be accidentally booted by the user without the UTD 20. More in detail, in order to prevent the user to accidentally boot the PC 10 on the PC's data storage device, without the UTD 20, this initial boot block has to be removed or replaced with a different version thereof (ideally during the set-up phase). If such options are implemented, the change to the OS loader 24b may need to be taken into account, e.g., notably when performing the comparison, step S261.

Of course, depending on the implementation design chosen, it may be more suited to extract the initial boot blocks from the OS loader S24b as already loaded in the main memory and if necessary to relocate them in the main memory or, conversely, to load again the initial boot blocks from the UTD 20. Similarly, a functional dependency between steps S242 and S252 in FIG. 6 may exist.

One way to modify the boot environment is to load the initial boot blocks of the OS loader 24b into the same memory region as would otherwise be done by the PC's BIOS. In addition, the execution of the boot loader 16 may cause to set the boot parameters to the same values as the PC's BIOS would do except that the parameters identifying the actual boot device are set in a way that the initial boot code assumes it has been loaded from the PC's HDD 11. In typical implementations, the initial boot blocks correspond to the MBR and the parameter indicating the boot device is the dl register. For example, the boot environment may be modified by: (i) setting S251 a boot device parameter, such as a dl register, to a device identifier of the HDD 11; and (ii) starting S281 execution of the loaded or stored initial boot block of executable code to trigger execution S282 of other blocks of the transferred OS loader 24b.

In order to mimic the BIOSes of, for example, compatible PCs, the boot loader 16 may, in addition, be designed such that its execution will cause to copy S252 the identified boot block of executable code to a suitable address in the main memory, prior to starting S281 execution of the loaded or stored initial boot block of executable code. For example, to emulate what the BIOS or other firmware of the PC would normally do, the boot loader 16 may be designed such that the execution of the boot loader 16 causes to: load or copy S241 initial boot blocks of executable code from the UTD 20 into the main memory, at a given, specific address therein (a MBR is for instance loaded at a specific address of the main memory, which for certain PCs would be address 0000: 7c00); set S251 a dl register (or more generally an appropriate boot device parameter) to a device identifier of the HDD 11; and start S281 execution of the loaded/copied initial boot blocks of executable code at the given address, which then triggers the execution of the remainder of the OS loader 24b, as stored on the HDD 11, step S282.

There are, however, other implementations possible. For example, the initial boot blocks may correspond to an EFI application, which itself may correspond at least partly to the OS loader and the parameter indicating the boot device would be contained in the DeviceHandle field of the EFI_LOADED_IMAGE_PROTOCOL data structure.

Figure 5:
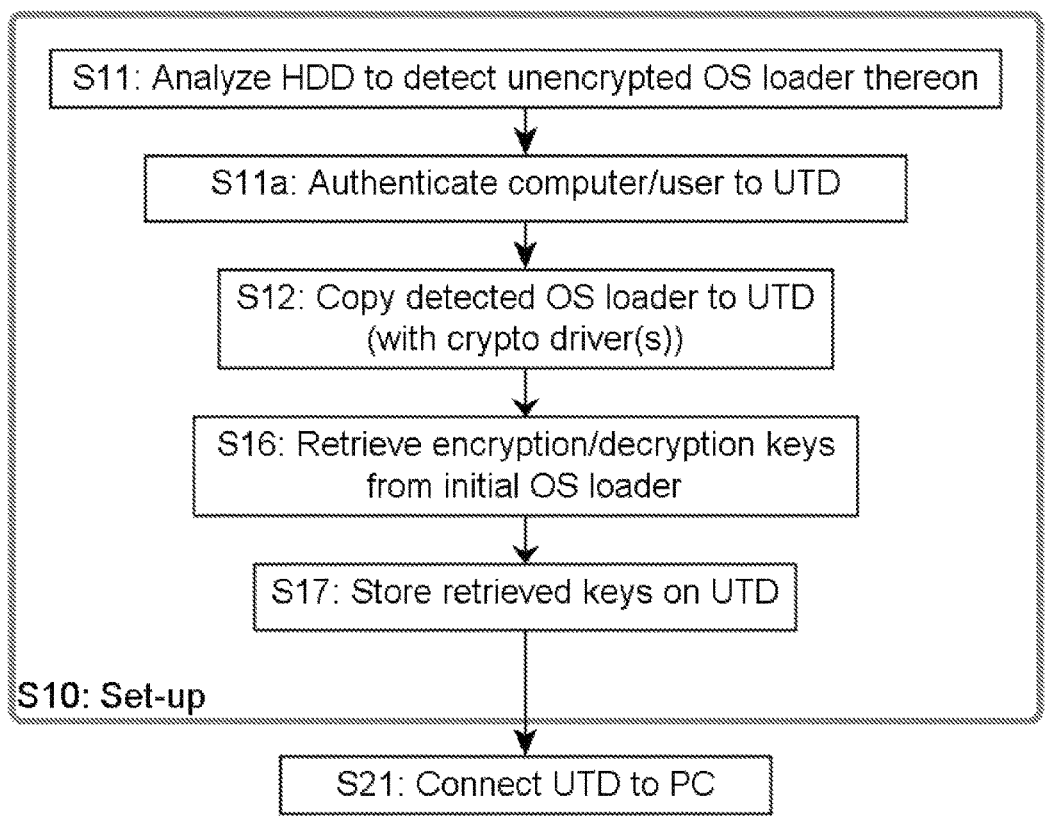
FIG. 5 is a flowchart illustrating steps of a set-up phase, as it typically takes place before implementing the steps of the flowchart of FIG. 3 or 4, as involved in embodiments.

At present, more shall be said about the set-up phase S10, in reference to FIG. 5. In embodiments, the present methods may further comprise prior steps of initialization of the UTD 20. Such initialization steps occur prior to the aforementioned step S21 (FIGS. 3 and 4) of connection of the UTD 20 to the PC 10. Of course, the initialization of the UTD 20 may nevertheless involve connecting the UTD 20 to the PC 10.

The initialization may comprise the steps of: analyzing S11 the HDD 11 to detect a version of the OS loader 24 which resides unencrypted on the HDD 11 of the PC 10; and, after authentication S11a to the UTD 20, copying S12 a detected version of the OS loader 24 to the UTD 20, as the OS loader 24a. Such steps should ideally be performed as early as possible, to install the OS loader 24a on the UTD 20, i.e., before any malicious user had a chance to tamper with the OS loader 24 (which, as mentioned before, resides unencrypted and modifiable on the HDD 11). To achieve this, one typically needs to connect the UTD 20 to the PC 10, although other, more complex implementations can be contemplated.

Note that here the PC 10 shall typically need to authenticate itself to the UTD 20, in order to allow to copy the detected version of the OS loader 24 thereon. Authentication will likely occur in one of the following ways:

1) Some code is sent from the PC 10 to the UTD 20, which is supplied by the user via the PC's keyboard;
2) The user authenticates directly to the UTD 20;
3) The UTD 20 is designed to initially accept any OS loader 24. But as soon as a first OS loader 24a has been stored, any subsequent modification would require authentication. This can be simply achieved by maintaining an appropriate parameter that identifies a state of the UTD 20 (i.e., modifiable or not).

In embodiments, and as further illustrated in FIG. 5, the set-up phase S10 may further comprise steps of: retrieving S16 a key (or more) for encrypting and decrypting the HDD 11 (depicted as EK and DK in FIG. 1); and then storing S17 the retrieved key(s) on the UTD 20 (or even another entity, such as smart card, which communicates with the UTD's processing capabilities) and removing the retrieved at least one key from the PC 10.

Depending on the exact context, the key(s) may for instance be retrieved from the PC 10, e.g., from a version of the OS loader 24 as initially managed by the PC, or from an external storage device (distinct from the present UTD 20). For example, the key(s) as such may be stored on an external medium, for security reasons, and one may need to copy them from this medium to the UTD 20.

The above scheme allows to secure the retrieved keys. This also means that one may have to update the OS loader 24 for it to know where such keys are and how to access the relocated keys.

During the boot process, the keys stored on the UTD 20 are preferably revealed only if the user successfully authenticates her(him)self to the device. This could notably take place through the use of a user interface on the device or as part of the boot loader 16 executing on the PC 10. However, prompting to enter a passphrase via the screen and keyboard of the computer is more convenient. Depending on whether the same passphrase may be used for other services (e.g., a single-sign-on implementation), from a security perspective using the UTD 20, however, may be preferable.

At present, referring back to FIGS. 3 and 4, more is said about the possible update processes. The transfer S24 of the OS loader 24a from the UTD 20 to the PC 10 typically involves copying contents of the OS loader 24a (typically a largest part thereof) onto the HDD 11, in place of the initial version 24 of the OS loader 24, as currently stored on the HDD 11. The currently stored version OS loader 24 would however typically be the same as the replacing version OS loader 24b if the PC's version OS loader 24 was not modified, e.g., tampered with. Thus, the replacing OS loader 24b is typically the same as the initial version OS loader 24 (although it does not need to be, as explained later).

Note that, in the present context, the OS does not know about the UTD 20. Thus, during a legitimate update of the OS loader 24, the OS may update the OS loader 24 as stored on the PC's storage device. The OS and OS loader 24 will typically refer to the original HDD 11 of the PC 10 for booting, updating or other purposes. Now, a suitable update mechanism is needed to consistently update the OS loader 24a on the UTD 20. To that aim, updates to the PC's OS loader 24 can be suitably identified, e.g., by inserting a device driver or other mechanism that captures the write accesses to the OS loader 24 and subsequently triggers updating the UTD 20. Such an update mechanism should preferably be implemented in a way that both the OS loader 24 on the PC and its corresponding version 24a on the UTD 20 will be updated synchronously or with minimal delay. Therefore, the two versions of the OS loader 24, 24a are normally identical, unless one or each one of them was tampered with. Other mechanisms for identifying such updates could include verifying whether the OS loader has been changed, at intervals and/or when the OS is being shut down by the user.

An example of update mechanism, S30, is illustrated in FIGS. 3 and 4. After completing the booting of the PC: this mechanism monitors S31 changes to the version of the OS loader 24, which resides unencrypted on the HDD 11 of the PC 10. Upon detecting S32 a change to this version OS loader 24, it may prompt to connect the UTD 20. Then, after authentication S32a to the UTD 20, this mechanism proceeds to update S33 the OS loader 24a stored on the UTD 20 according to the PC's version OS loader 24 just changed. This mechanism may further take care of updating any other component needed, such as the crypto drivers. This possibility offered by the update mechanism, of course, concerns legitimate updates. Thus, some additional checking may be needed to ascertain the legitimacy of the detected update.

In an embodiment, for some OSs, for example, another driver would have to be loaded in the OS to identify write access to the PC's OS loader. This driver may update the version 24a stored on the UTD 20, while the OS loader 24 is being updated. In alternate embodiments, one may capture such changes when the PC 10 shuts down. The downside of the latter approach is that in case the PC 10 shuts down unexpectedly the UTD 20 may not have the latest version of the OS loader 24a. Furthermore, on a subsequent reboot, the UTD 20 may identify a potentially missed update as a tamper-attempt especially when a "Honeypot" approach is used (see below).

In another embodiment, for some OSs, the update may require to update or replace a dedicated update program, for it to cause to update the OS loader 24a as residing on the UTD 20 instead of the OS loader 24 residing on the PC 10.

At present, a so-called "Honeypot" approach is described, in reference to FIG. 4. In embodiments, the present methods may further be refined such that, as depicted as S20 in FIG. 4, upon connection of the UTD 20 to the PC 10, the boot loader 16 will be detected by the PC's firmware and its subsequent execution will cause to compare S26 the version of the OS loader 24 already stored on the HDD 11 to the OS loader 24a as transferred S24 from the UTD 20. Next, whether the transferred OS loader 24b will be allowed to execute S28 depends on an outcome of the comparison S261. Typically, the transferred OS loader 24b will be allowed to execute S28 only if the compared versions do not differ. This comparison allows to detect attempts to tamper with the stored OS loader 24. Note, if the initial boot blocks have been replaced to prevent the user from accidentally booting from the PC 10, this needs to be taken into account during the comparison.

If it is found that the compared versions differ, then preferably the user is notified for action (S262). The user may decide to shut down the PC 10 and hand it over to a forensic team to analyze and appropriately respond to the attack (not shown). For instance, one may want to analyze the modified boot loader in order to find out how an attacker tried to obtain access to the computer. This may potentially allow to identify who the attacker is or lure the attacker into a trap forcing her/him to reveal the attacker's identity.

If, for instance, the user, is in urgent need to access the PC 10, contents of the OS loader 24b as already loaded in the main memory of the PC 10 may be stored S27 on the HDD 11, prior to execution S28, to re-instate a secure version of the OS loader 24. Note that if the user decides to bypass the forensic analysis and to use the PC 10 nonetheless, a subsequent forensic analysis would become more difficult, even if the OS loader 24 as stored on the PC 10 is rescued for further analysis.

Figure 1:
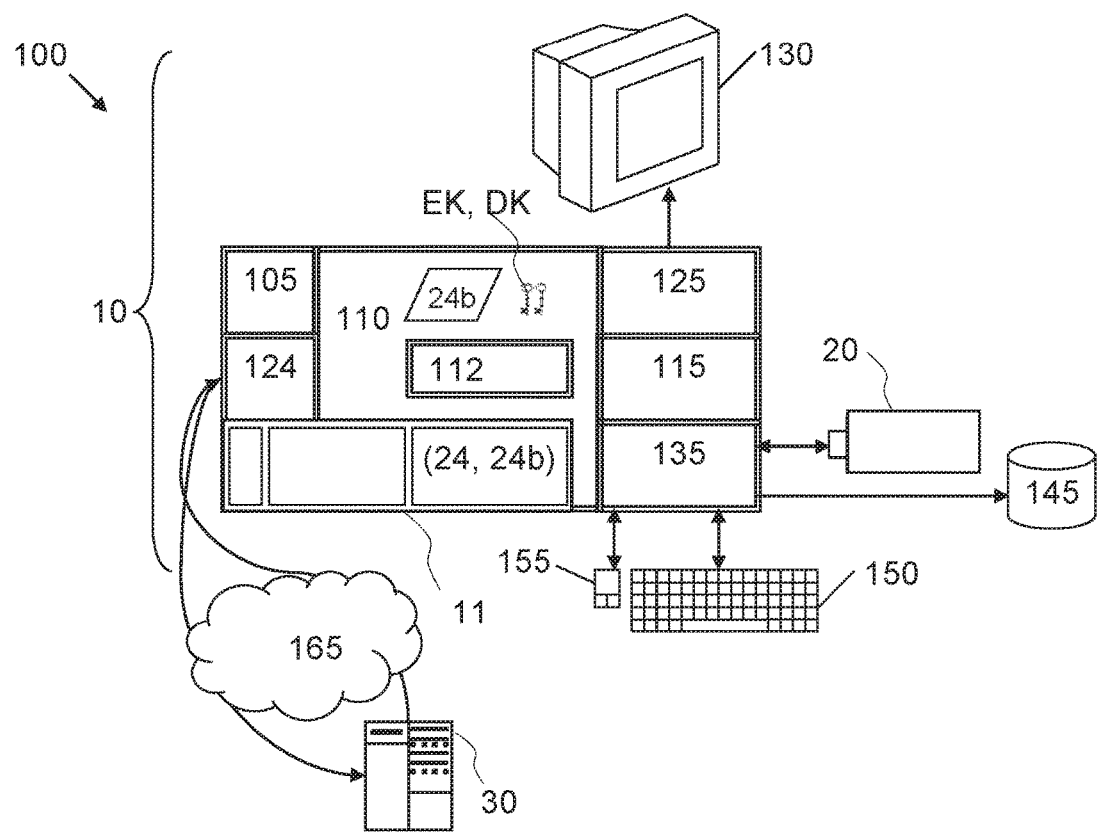
FIG. 1 schematically represents a general purpose computerized system according to embodiments of the invention; this system is specifically designed for implementing method steps involved in embodiments of the invention.

Referring now more particularly to FIGS. 1, 2, and according to another aspect, the present invention can also be embodied as a user trusted device 20, suitably designed for allowing a PC 10 to boot from this device 20. As discussed earlier, the UTD 20 is connectable to the PC 10 and stores the boot loader 16 and the OS loader 24a (unencrypted), where this OS loader 24a corresponds to a version 24 of an OS loader as initially installed on the PC 10. The UTD 20 is furthermore designed to prevent any unauthenticated user to modify any of the boot loader 16 and the OS loader 24a stored thereon. As discussed above, in reference to FIGS. 3, 4 and 6, the boot loader 16 and the OS loader 24a are otherwise designed to make it possible and allow to implement all the steps discussed in reference to FIGS. 3, 4 and 6. The UTD 20 is further designed to enable a proper set-up as discussed in reference to FIG. 5. Additional aspects of the UTD 20 are described in the next section.

Next, and according to another aspect, the invention can be embodied as a computerized system 100, as depicted in FIG. 1, which comprises the UTD 20 as well as the PC 10 (or more generally any computer), to which the UTD 20 is connectable.

The invention can finally also be embodied as a computer program product for allowing a computer to boot from a UTD 20, where the computer program product comprises a computer-readable storage medium having computer-readable program code embodied therewith, e.g., consisting of several modules, where the computer-readable program code is configured to implement the steps discussed in reference to FIGS. 3-6. Additional aspects of such a computer program product are described in the next section.

The above embodiments have been succinctly described in reference to the accompanying drawings and may accommodate a number of variants. Several combinations of the above features may be contemplated. Examples are given in the next section.

2. Specific Embodiments/Technical Implementation Details
2.1 User Trusted Device Referring now more particularly to FIG. 2, possible embodiments of the user trusted device 20 are now discussed in detail.

Various types of trusted devices can be contemplated for implementing present methods. First, the user trusted device 20 should be reasonably "mobile" to allow for an easy and practical connection with the computer 10. It is typically a corporate or personal secure device, that is, a device that a company or a user owns and controls, such as a USB device, preferably a USB flash drive (a data storage device that includes flash memory, in addition to an integrated Universal Serial Bus (USB) interface), a mobile phone or a personal digital assistant (PDA) that only this user uses or that is owned and controlled by the company this user works for. Typically, this device 20 weighs less than 200 g. However, owing to the rather limited requirements in terms of user interfaces, memory and processing capability of the device 20, this device shall preferably weighs less than 60 g and more preferably less than 40 g.

The user trusted device 20 may be provided with processing means (and/or computing means, i.e., CPU) 211, such as a crypto processor, coupled to a memory, which generally comprises a persistent memory 214 and, possibly, a non-persistent memory too (not explicitly shown but the non-persistent memory can be considered to be part of the processing means 211). Yet, a non-persistent memory and a processor are not mandatory for implementing the essential steps described in the previous section. Although, a processor is not strictly necessary, implementing the authentication mechanism and maintaining the state parameter (as to whether the device is modifiable or not) is easier to implement by use of a processor or micro-controller. The non-persistent memory and a processor may, however, be needed in cases of concurrent execution of the boot loader 16 and the OS loader 24a at the PC 10 and the UTD 20, or if additional functionality is sought, such as additional verifications involving the BIOS. In the present context, the persistent memory 214 notably stores computerized methods 217, interacting with other components stored on the device 20 (which components may be executable modules or code 16, 24a, data 22, 220, or keys 213) or still other peripheral components 218, as necessary for operating the device 20. In particular, computerized methods 217 may interact with the processing means 211 to trigger the transfer and execution of the boot loader 16, the latter meant to be executed by processing means 105, 211 of the computer 10 and/or the device 20. The boot loader 16 and the OS loader 24a can, each, be regarded as a single module provided with different functions, and able to execute at the device and/or the computer, or as complex modules having different functions. They may also be regarded as forming parts of the computerized methods 217.

Preferably, the boot loader and OS loader that reside on the user trusted device shall occupy as little memory as possible. For instance, some implementations have been successfully tested which use less than 128 mo for the boot loader and OS loader the size mostly determined by the size of the OS loader which is OS dependent. Additionally, the user trusted device should provide enough storage capability for storing data unit(s) 22, 220, which may typically take up to 64 ko, for instance, if the trustworthiness of the BIOS is to be attested by these modules. This excludes storage necessary to store components of the OS 112 or UTD's components designed to retrieve such OS components from the network.

The connection interface 212 to the PC 10 may for instance be of the following type:
Universal Serial Bus or USB;
External Small Computer System Interface or SCSI;
External Serial Advanced Technology Attachment or SATA;
Firewire; or
Thunderbolt.

More generally though, this could be any current or future connector (wired or wireless) that allows the computer 10 to boot from the external user trusted device 20. In addition, the same interface 212 can furthermore allow the user trusted device 20 for communicating with any external device such as a beamer, a printer, or any other output device.

If necessary, the secure user trusted device 20 has a card reader to read user credentials stored on a memory card, e.g., the non-secure memory or any smart card. Suitable use can safely be made out of such data, e.g., user credentials as stored on the card. In particular, a trustworthy connection can be established between a user (or strictly speaking the device 20) and a third party, e.g., server 30, via the host computer 10 and using such data. In a variant, the user credentials may be stored directly on the secure device. Further usual interfaces (like control buttons and display) may be provided to allow for interaction with the user. Most notably, such trustworthy display on the secure user trusted device 20 can be used to obtain user assertions about the environment s/he presently is in. This way, for example, but without limitation, a user can confirm requests by the server 30 to ascertain that s/he is not in a public space such as an Internet café, when starting the computer 10.

2.2 Aspects of Computerized Systems, Devices and Computer Program Products Suitable for Implementing Embodiments of the Invention FIG. 1 represents a general computerized system 100, suited for implementing method steps as involved in embodiments of the invention.

It will be appreciated that the methods described herein are largely non-interactive, and automated by way of computerized systems, such as servers or embedded systems. In exemplary embodiments, the methods described herein can be implemented in a (partly) interactive or non-interactive system. These methods can further be implemented at least partly in software, firmware, hardware, or combinations thereof. In exemplary embodiments, the methods described herein are implemented at least partly as executable programs (e.g., being part of a boot loader) and is executed at least in part by a special or general-purpose digital computer 10, such as a personal computer, workstation, minicomputer, or mainframe computer. The most general computerized system 100 therefore includes general-purpose computer, e.g., a PC 10.

In exemplary embodiments, in terms of hardware architecture, as shown in FIG. 1, the computer 10 includes a processor 105, memory 110 coupled to a memory controller 115, and one or more input and/or output (I/O) devices (or peripherals) 20, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 20, 145 may generally include any generalized cryptographic card or smart card known in the art. One or more of these devices may be user trusted devices 20, as discussed above.

The processor 105 is a hardware device for executing software, particularly, software that is stored in memory 110. The processor 105 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 110 typically includes volatile memory elements (e.g., random access memory (RAM, such as DRAM, SRAM, SDRAM, etc.)) and possibly nonvolatile (persistent) memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate or link to electronic, magnetic, optical, and/or other types of storage media. Note that the memory 110 can have a distributed architecture, where various components are situated remote from one another, but can be accessed by the processor 105. Memory portions can be allocated to specific purposes, e.g., to be mounted as a RAM disk, to receive components of the boot loader and/or the OS loader such as executable modules (including processor instruction modules), for subsequent execution at the computer 10.

In operation, software/program code involved in embodiments of this invention, for instance software/program code to be transferred to memory 110, may include one or more separate programs, each of which comprises a listing of executable instructions for implementing logical functions. In the example of FIG. 1, memory 110 may be loaded with instructions for enabling the computer 10 to start and complete booting from the user trusted device 20.

Components to be loaded in memory 110 may comprise various application components and operating system image components, and preferably hardware component drivers too. The memory 110 may thus be set in condition to execute a suitable OS 112. The novel methods discussed here nevertheless operate at least partly "before" any OS component be fully loaded at the host computer 10. At least some of these steps operate at another level, closer to hardware, whereby the normal behavior of the computer 10 is impacted. Upon (and if) executing, the OS 112 shall essentially control the execution of application programs, and provide scheduling, input-output control, file and data management, memory management, and communication control and related services.

At least part of the methods described herein may be in the form of a source program, executable program (object code), script, or any other entity comprising a set of instructions to be performed. When a source program, then the program needs to be translated via a compiler, assembler, interpreter, or the like, which may or may not be included within the memory(ies) of the device 20 and/or the host computer 10. Furthermore, the methods can be written as an object oriented programming language, which has classes of data and methods, or a procedure programming language, which has routines, subroutines, and/or functions. In all cases, the novel methods discussed herein are designed so as to operate properly in connection with the firmware, where needed, and with the device's HDD 11, as needed.

In exemplary embodiments, a conventional keyboard 150 and mouse 155 can be coupled to the input/output controller 135. Other I/O devices 145 may include, for example a printer, a scanner, microphone, and the like. Finally, the I/O devices 20, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. As otherwise evoked in the previous section, the I/O devices 20, 145 may comprise any generalized cryptographic card or smart card known in the art. The computerized system 100 can further include a display controller 125 coupled to a display 130. In exemplary embodiments, the computerized system 100 can further include a network interface 124 for coupling to a network 165. The network 165 can be an IP-based network for communication between the computer 10 and any external server, client and the like via a broadband connection. The network 165 transmits and receives data between the computer 10 and external systems, e.g., a server 30. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 10 is a PC, workstation, intelligent device or the like, the software in the memory 110 may further include a basic input output system (BIOS) or any similar initialization software. The BIOS is a set of essential software routines that initialize and test hardware at startup. It is otherwise generally able to start an OS, and support the transfer of data among the hardware devices. The BIOS is typically stored in ROM so that the BIOS can be executed when the computer 10 is activated.

For the purpose of implementing methods as described herein, the BIOS can be used (interacted with) notably to initiate the boot process and complete it, as well as, possibly, to initiate a communication over a network. More generally though, any suitable firmware or interface to a firmware (i.e., a combination of persistent memory and program code and data stored therein, which operates "below" the OS 112 in the software stack), can be used to that aim. This typically is the BIOS. However, examples of suitable firmwares or interface thereto include the so-called Extensible Firmware Interface (EFI) BIOS or, still, the Unified Extensible Firmware Interface (UEFI). The latter is a specification that defines a software interface between the operating system and the platform firmware. UEFI is meant to replace the BIOS firmware interface, present in all IBM PC-compatible computers today. In practice, UEFI provides the same and even more functionality than a traditional PC BIOS and can be used as well. More generally, any initialization firmware operating below the operating system in the software stack may potentially convene for the purpose of implementing the present invention.

When the computer 10 is in operation, the processor 105 is configured to execute software stored within the memory 110, to communicate data to and from the memory 110, and to generally control operations of the computer 10 pursuant to the software. The methods described herein, in whole or in part, but typically the latter, are read by the processor 105, possibly buffered within the processor 105, and then executed.

The portions of the methods described herein that can be implemented in software can be stored on any computer readable medium for use by or in connection with any computer related system or method.

The present invention may be a system, a method and/or a computer program product. The computer program product may include a computer readable storage medium (or media) having computing readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, or partly on the user's computer (as a stand-alone software package), or still partly on two or more of the following: the user's computer 10, the user trusted device 20, and a remote computer server 30. The host computer 10 and the server 30 may be connected through any type of network, including: local area network (LAN); wide area network (WAN); connection to an external computer (Internet, using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

2.3 Final Considerations

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation to the teachings of the present invention without departing from its scope. Therefore, it is intended that the present invention not be limited to the particular embodiments disclosed, but that the present invention will include all embodiments falling within the scope of the appended claims. In addition, many variants not explicitly touched above can be contemplated. For example, the secure device could be powered with solar cells or any other suitable batteries, etc. As touched earlier, the computerized methods described herein have been described according to their main functions, e.g., some of which have been assigned to various modules of the boot loader 16. However, embodiments of the present invention could be equivalently described with the same functions recast over only one module, or more modules.

What is claimed is:

1. A method for allowing a computer to boot from a user trusted device, wherein:

the computer includes a long-term data storage device storing operating system services, and a first version of an operating system loader (OS loader), and the user trusted device is connectable to the computer and stores at least:

a boot loader, detectable and executable by a firmware executing at the computer upon connection of the user trusted device to the computer;

a transferred OS loader, for an operating system of the computer, the transferred OS loader corresponding to the first version of the OS loader as stored on the long-term data storage device of the computer, wherein the user trusted device is designed to prevent an unauthenticated user to modify any of the boot loader and the transferred OS loader stored thereon, the method comprising:

analyzing the long-term data storage device to detect the first version of the OS loader which resides unencrypted on the long-term data storage device of the computer;

after authentication to the user trusted device, copying the first version of the OS loader to the user trusted device, as the transferred OS loader;

retrieving at least one key for encrypting and decrypting the long-term data storage device;

storing the retrieved at least one key on the user trusted device;

removing the retrieved at least one key from the computer;

upon subsequent connection of the user trusted device to the computer, letting the boot loader be detected by the firmware for subsequent execution of the boot loader at least partly at the computer, to cause to transfer the transferred OS loader from the user trusted device to the computer, wherein letting the boot loader be detected by the firmware further comprises:

storing an initial boot block comprising an initial 512 bytes of the transferred OS loader in a main memory of the computer at an address comprising 0000:7c00;

storing a remainder of the transferred OS loader in the long-term data storage device;

modifying a boot environment by setting a dl register to a device identifier of the long-term data storage device;

comparing the first version of the OS loader already on the computer to the remainder of the transferred OS loader as transferred from the user trusted device to the long-term data storage device;

if the compared versions do not differ, executing the transferred OS loader at least partly from the computer; and if the compared versions differ, notifying a user that the compared versions differ;

executing the transferred OS loader at least partly from the computer in response to determining that the compared versions do not differ, to cause to execute at least one crypto driver for the operating system and a kernel of the operating system, to start the operating system services and complete booting of the computer, wherein executinq the transferred OS loader further comprises executing the transferred OS loader at least partly from the long-term data storage device of the computer and at least partly from the main memory of the computer;

monitoring, after completing the booting of the computer, changes to the first version of the OS loader, which resides unencrypted on the long-term data storage device of the computer;

upon detectinq a chanqe to the first version of the OS loader, authenticatinq to the user trusted device and updating the transferred OS loader stored on the user trusted device accordingly.

\* \* \* \* \*